W. BENNETT.
TAKE-DOWN FIREARM.
APPLICATION FILED APR. 25, 1910.

963,680.

Patented July 5, 1910.

UNITED STATES PATENT OFFICE.

WINCHESTER BENNETT, OF NEW HAVEN, CONNECTICUT, ASSIGNOR TO WINCHESTER REPEATING ARMS CO., OF NEW HAVEN, CONNECTICUT, A CORPORATION.

TAKE-DOWN FIREARM.

963,680.  Specification of Letters Patent.  Patented July 5, 1910.

Application filed April 25, 1910. Serial No. 557,317.

*To all whom it may concern:*

Be it known that I, WINCHESTER BENNETT, a citizen of the United States, residing at New Haven, in the county of New Haven and State of Connecticut, have invented a new and useful Improvement in Take-Down Firearms; and I do hereby declare the following, when taken in connection with the accompanying drawings and the numerals of reference marked thereon, to be a full, clear, and exact description of the same, and which said drawings constitute part of this specification, and represent, in—

Figure 1:
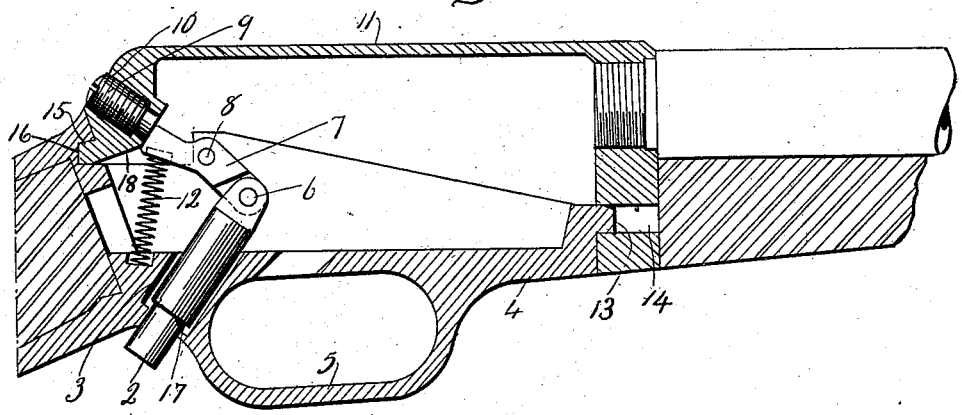
Figure 2:
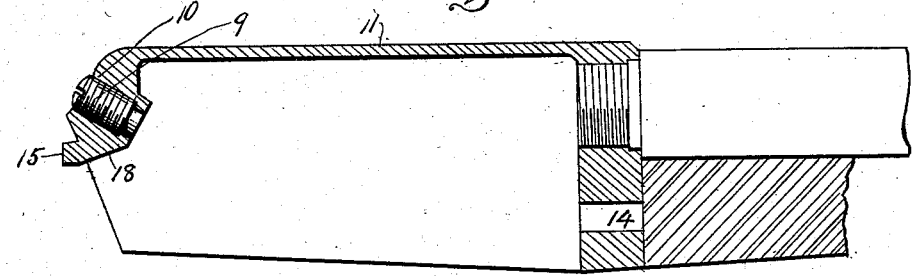
Figure 3:
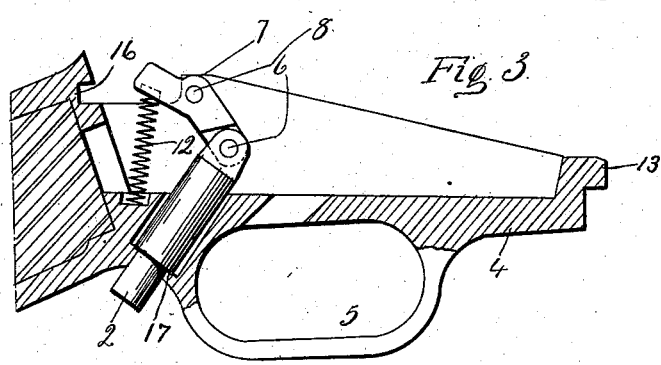

Figure 1 is a broken view in vertical longitudinal section of a take-down gun constructed in accordance with my invention. Fig. 2 is a broken view in vertical section of the frame and barrel of the gun. Fig. 3 is a corresponding view of the tang and butt-stock of the gun.

My invention relates to an improvement in that class of take-down guns in which the gun-frame and tang are interlocked and held in their interlocked relations by means of a locking-dog, the object being to locate in the gun itself, a simple and convenient means of operating the locking-dog preparatory to taking down the gun.

With these ends in view my invention consists in a take-down gun having certain details of construction and combinations of parts as will be hereinafter described and pointed out in the claims.

In carrying out my invention, as herein shown, I employ an operating plunger 2, located in an inclined position in a socket 3, formed in the tang 4, at a point directly at the rear of the rear end of the trigger-guard 5. The lower end of the said plunger 2 projects sufficiently below the outer surface of the tang to permit the plunger to be readily engaged and operated. The upper end of the plunger 2 is connected by a pivot 6 with the forward end of a locking-dog 7, hung on a pivot 8 in the upper portion of the tang 4, the rear end of the dog 7 being adapted to engage with the inner end of an adjustable abutment-screw 9, located in an inclined position in a threaded opening 10, in the rear end of the gun-frame 11. A helical spring 12 located between the rear end of the dog 7 and the tang 4 exerts a constant effort to maintain the dog in its operating position, in which its rear end is engaged with the inner end of the screw 9, whereby the tenon 13 at the forward end of the tang is maintained in the mortise 14, in the forward end of the frame, and whereby the tenon 15, at the rear end of the frame, is maintained in the mortise 16 in the rear end of the tang. A shoulder 17, near the lower end of the plunger 2, limits the rocking movement of the dog 7 on the pivot 8 when the gun is taken down as shown in Fig. 3. A cam-surface 18, formed upon the frame 11 at a point just in front of the tenon 15, provides for engaging with the upper rear corner of the dog 7, so as to crowd the same downward against the tension of its spring 12, and permit the tenon 15 to be entered into the mortise 16. When the tenon 13 has been entered into the mortise 14, and the tenon 15 has been entered into the mortise 16, the spring 12 acts to lift the rear end of the dog 7 against the inner end of the abutment screw 9, whereby the said dog and screw act in opposition to the removal of the respective tenons from their mortises.

To take down the gun, the user pushes the plunger 2 inward against the tension of the spring 12, whereby the dog 7 is rocked on its pivot 8 and its rear end cleared from the screw 9, after which the frame 11 and the tang 4 of the gun may be slipped apart.

I claim:—

1. In a take-down gun, the combination with the frame and tang thereof, the said parts being adapted to be interlocked by their longitudinal movement with respect to each other, of an abutment screw mounted in the said frame at the rear end thereof, a locking-dog located within the gun and adapted at its rear end to be engaged with the inner end of the said screw, a spring arranged to exert a constant upward pressure on the rear end of the said dog, an operating-plunger mounted in the gun and permanently connected with the dog for moving the same into its clearance position preparatory to taking the gun apart, and means for limiting the outward movement of the said plunger against the force of the said spring.

2. In a take-down gun, the combination with the frame and tang thereof, the said parts being adapted to be interlocked by their longitudinal movement with respect to each other, of a locking-dog located within the gun and operating to hold the said parts interlocked, a spring arranged to exert a constant upward pressure on the rear end of the said dog, an operating-plunger mounted in the said tang and pivotally connected at its inner end with the said dog for operating the same to permit the said frame and tang to be separated and the gun taken down, and means for limiting the outward movement of the said plunger against the force of the said spring.

In testimony whereof, I have signed this specification in the presence of two subscribing witnesses.

WINCHESTER BENNETT.

Witnesses:
DANIEL H. VEADER,
THOMAS C. JOHNSON.